United States Patent
Oh et al.

(10) Patent No.: US 11,824,190 B2
(45) Date of Patent: Nov. 21, 2023

(54) CATHODE MATERIAL FOR LITHIUM SECONDARY BATTERY AND METHOD OF MANUFACTURING THE SAME

(71) Applicants: Hyundai Motor Company, Seoul (KR); Kia Motors Corporation, Seoul (KR); Industry Academy Cooperation Foundation of Sejong University, Seoul (KR)

(72) Inventors: Seung Min Oh, Incheon (KR); Ik Kyu Kim, Gyeonggi-do (KR); Yeol Mae Yeo, Gyeonggi-do (KR); Sang Mok Park, Gyeonggi-do (KR); Yoon Sung Lee, Gyeonggi-do (KR); Nam Hyeong Kim, Gyeongsangbuk-do (KR); Ji Eun Lee, Gyeonggi-do (KR); Dong Jun Kim, Gyeonggi-do (KR); Seung Taek Myung, Seoul (KR); Ji Ung Choi, Seoul (KR)

(73) Assignees: Hyundai Motor Company, Seoul (KR); Kia Corporation, Seoul (KR); Industry Academy Cooperation Foundation of Sejong University, Seoul (KR)

(*) Notice: Subject to any disclaimer, the term of this patent is extended or adjusted under 35 U.S.C. 154(b) by 364 days.

(21) Appl. No.: 16/928,507

(22) Filed: Jul. 14, 2020

(65) Prior Publication Data

US 2021/0184206 A1 Jun. 17, 2021

(30) Foreign Application Priority Data

Dec. 16, 2019 (KR) .......................... 10-2019-0167916

(51) Int. Cl.
*H01M 4/36* (2006.01)
*H01M 4/485* (2010.01)
(Continued)

(52) U.S. Cl.
CPC .......... *H01M 4/366* (2013.01); *H01M 4/131* (2013.01); *H01M 4/133* (2013.01);
(Continued)

(58) Field of Classification Search
CPC .. H01M 10/052; H01M 10/0525; H01M 4/38; H01M 4/131; H01M 4/133;
(Continued)

(56) References Cited

U.S. PATENT DOCUMENTS

| 10,263,256 | B2* | 4/2019 | Mitsumoto | ............ C01G 53/00 |
| 2008/0010796 | A1* | 1/2008 | Pan | ........................ H01G 11/26 29/25.03 |

(Continued)

FOREIGN PATENT DOCUMENTS

| CN | 108878832 A | * 11/2018 |
| KR | 102046418 B1 | 12/2019 |

OTHER PUBLICATIONS

CN 108878832 A—Machine translation (Year: 2023).*

*Primary Examiner* — William E McClain
*Assistant Examiner* — Bethany C Bouchard
(74) *Attorney, Agent, or Firm* — Fox Rothschild LLP

(57) ABSTRACT

Disclosed are a cathode material for a lithium secondary battery and a method of manufacturing the same. For instance, the lithium secondary battery may have a high energy density by using only a single cathode material. Particularly, the cathode material for a lithium secondary battery includes a Li—[Mn—Ti]—Al—O-based cathode active material; and a carbon nanotube (CNT) attached to the surface of the cathode active material in an acid-treated state to be formed as a composite.

11 Claims, 15 Drawing Sheets

(51) Int. Cl.
*H01M 4/38* (2006.01)
*H01M 4/131* (2010.01)
*H01M 4/133* (2010.01)
*H01M 4/1391* (2010.01)
*H01M 10/0525* (2010.01)
*H01M 4/02* (2006.01)

(52) U.S. Cl.
CPC ........... *H01M 4/1391* (2013.01); *H01M 4/38* (2013.01); *H01M 4/485* (2013.01); *H01M 10/0525* (2013.01); *H01M 2004/027* (2013.01)

(58) Field of Classification Search
CPC .. H01M 4/1391; H01M 4/1393; H01M 4/366; H01M 4/485; H01M 4/505; H01M 4/525; H01M 4/583; H01M 2004/02; H01M 2004/27; C01B 32/05; C01B 32/158–178
See application file for complete search history.

(56) References Cited

U.S. PATENT DOCUMENTS

| | | | |
|---|---|---|---|
| 2012/0244334 A1* | 9/2012 | Lee | H01G 11/50 |
| | | | 428/221 |
| 2015/0037680 A1* | 2/2015 | Park | H01M 4/525 |
| | | | 252/182.1 |
| 2020/0052288 A1* | 2/2020 | Yamamoto | H01M 10/0525 |

* cited by examiner

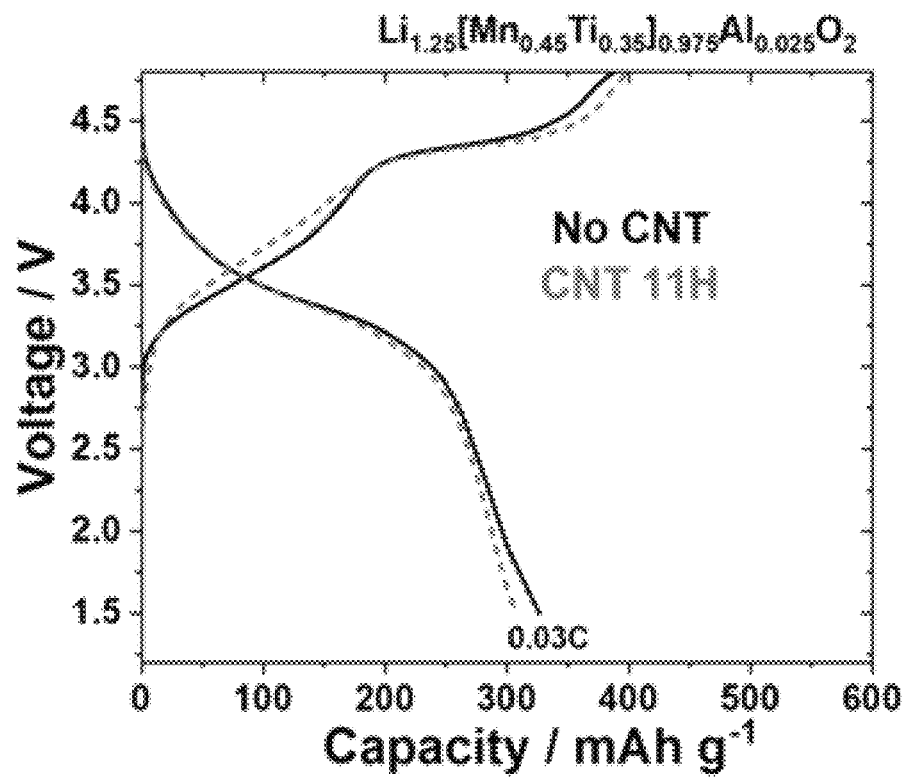
FIG. 7A
$Li_{1.25}[Mn_{0.45}Ti_{0.35}]_{0.975}Al_{0.025}O_2$
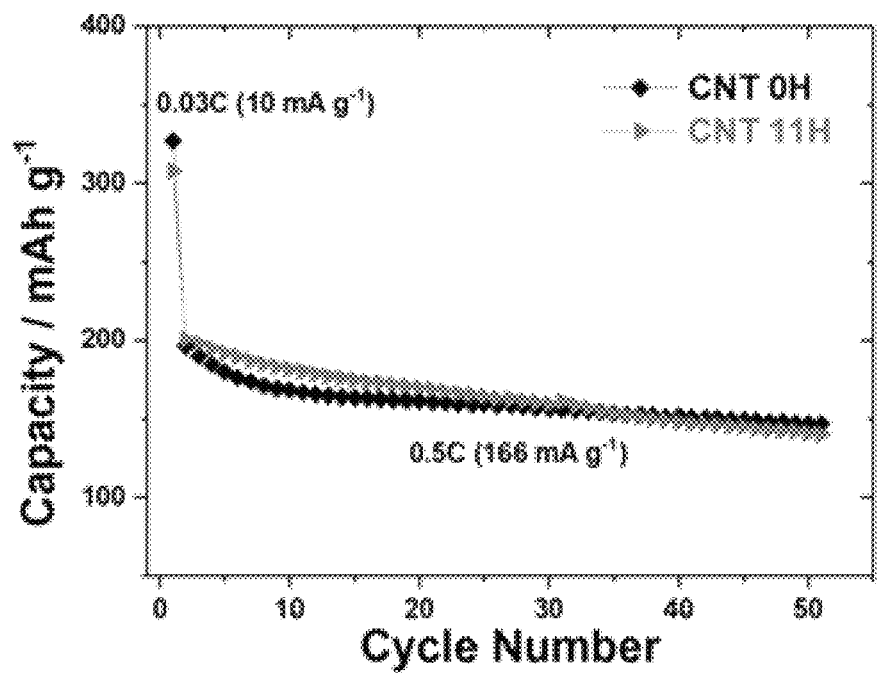

CATHODE MATERIAL FOR LITHIUM SECONDARY BATTERY AND METHOD OF MANUFACTURING THE SAME

CROSS REFERENCE TO RELATED APPLICATION

The present application claims priority of Korean Patent Application No. 10-2019-0167916 filed on Dec. 16, 2019, the entire contents of which is incorporated herein for all purposes by this reference.

TECHNICAL FIELD

The present invention relates to a cathode material for a lithium secondary battery and a method of manufacturing the same. Particularly, the lithium secondary battery may be manufactured to have a high energy density by using only a single cathode material.

BACKGROUND

Secondary batteries have been used as small-scale, high-performance energy sources for large-capacity power storage batteries such as electric vehicles or battery power storage systems, and portable electronic devices such as mobile phones, camcorders, and notebook computers. Accordingly, researches for reducing size or weight of the secondary batteries and achieving high capacity or low power consumption have been continued, which may be particularly, useful for portable electronic devices.

In particular, a lithium secondary battery, which is a representative secondary battery, has a greater energy density, a greater capacity per area, a less self-discharge rate, and a longer life than those of a nickel manganese battery or a nickel cadmium battery. In addition, the lithium secondary battery has the characteristics of ease of use and long life because there is no memory effect.

The lithium secondary battery produces electric energy by the oxidation and reduction reactions when lithium ions are intercalated and deintercalated from the cathode and the cathode in a state where the electrolyte has been charged between the cathode and the cathode made of an active material capable of intercalations and deintercalation of the lithium ions.

Such a lithium secondary battery is composed of a cathode material, an electrolyte, a separator, a cathode material, and the like, and it is very important to stably keep an interfacial reaction between components for securing long life and reliability of the battery.

In order to improve the performance of the lithium secondary battery as described above, research has been steadily conducted to improve the cathode material. In particular, many studies have been conducted to develop a high-performance and high-safety lithium secondary battery, but in recent years, safety problems are continuously raised due to frequent explosion accident of the lithium secondary battery.

Accordingly, the present applicant has completed the present invention by implementing a high energy density lithium secondary battery by implementing a high capacity, for example, of 250 m Ah/g or greater in a voltage range of 2 to 4.2 V when using a lithium-rich-based material.

The foregoing explained as the background is intended merely to aid in the understanding of the background of the present invention, and is not intended to mean that the present invention falls within the purview of the related art that is already known to those skilled in the art.

SUMMARY

In preferred aspects, provided are, inter alia, a cathode material for a lithium secondary battery and a method of manufacturing the same. The thus prepared lithium secondary battery may have high energy density only by using simply forming an acid-treated carbon nanotube (CNT) and a single cathode material as a composite.

In an aspect, provided is a cathode composite material for a lithium secondary battery that may include a Li—[Mn—Ti]—Al—O-based cathode active material; and a carbon nanotube (CNT) present on or with the cathode active material. For instance, the carbon nanotube (CNT) is suitably present on a surface of cathode active material, and for example the carbon nanotube (CNT) may be affixed to the cathode active material by covalent or non-covalent bonds. In particular aspects, the carbon nanotube suitably may be treated with an acid such that the acid-treated carbon nanotube may be attached to the surface of the Li—[Mn—Ti]—Al—O-based cathode active material.

The Li—[Mn—Ti]—Al—O-based cathode active material may suitably include $Li_{1.25}[Mn_{0.45}Ti_{0.35}]_{0.975}Al_{0.025}O_2$.

The cathode composite material may include carbon nanotube in an amount of about 1 to 5 wt % relative to the entire weight of the cathode composite material.

The carbon nanotube may have a length of about 50 to 100 μm, and a diameter of about 20 to 30 nm.

In another aspect, provided is a method of manufacturing a cathode composite material for a lithium secondary battery that may include preparing a Li—[Mn—Ti]—Al—O-based cathode active material; treating a carbon nanotube (CNT) by immersing and stirring it in an acidic solution; and forming the cathode composite material by combining the prepared Li—[Mn—Ti]—Al—O-based cathode active material and the treated carbon nanotube.

The Li—[Mn—Ti]—Al—O-based cathode active material may be prepared by steps comprising: synthesizing a composite by mixing $Li_2CO_3$, $Mn_2O_3$, $TiO_2$, and $Al_2O_3$ with anhydrous ethanol and first ball milling; pelletizing by washing and then drying the synthesized composite; and heating and firing the pelletized composite in an inert atmosphere to obtain a powder.

The composite may include $Li_{1.25}[Mn_{0.45}Ti_{0.35}]_{0.975}Al_{0.025}O_2$, and the composite was heated at a temperature of about 900 to 1000° C. for about 10 to 14 hours.

The carbon nanotube (CNT) may be treated by immersing in the acidic solution and stirring for about 10 to 14 hours.

The cathode composite material may suitably include Li—[Mn—Ti]—Al—O-based cathode active material in an amount of about 95 to 99 wt % and the carbon nanotube in an amount of about 1 to 5 wt % based on the total weight of the cathode composite material.

The forming the cathode composite material may include second ball milling the prepared Li—[Mn—Ti]—Al—O-based cathode active material and the treated carbon nano tube. Preferably, the second ball milling may be performed for about 12 to 24 hours.

Also provided is a lithium secondary battery a cathode including the cathode composite material as described herein; a cathode including a cathode active material; and an electrolyte. In particular, the cathode compote material may include a Li—[Mn—Ti]—Al—O-based cathode active material and a carbon nanotube (CNT) that is attached to the surface of the Li—[Mn—Ti]—Al—O-based cathode active material.

According to various exemplary embodiments of the present invention, the cathode material having the high energy density may be obtained only by coating an acid-treated carbon nanotube (CNT) on the surface of the cathode active material, as a form of composite, which can be used a single cathode material.

In particular, the carbon nanotube (CNT) may be coated on the Li—[Mn—Ti]—Al—O-based cathode active material, for example, by acid treatment to the carbon nanotube, thereby overcoming the air instability, structural instability, low lifetime characteristic, and low output characteristic of the cathode active material.

Accordingly, it is possible to construct the pure electric vehicle model, thereby reducing the manufacturing cost of the pure electric vehicle which is battery-centric as compared to hybrid and derivative electric vehicles in which the driving device is mounted on the previously designed vehicle structure.

BRIEF DESCRIPTION OF THE DRAWINGS

The above and other objects, features and other advantages of the present invention will be more clearly understood from the following detailed description when taken in conjunction with the accompanying drawings, in which:

FIGS. 7A and 7B are graphs showing the charge/discharge curves and cycle results of one cycle of a cathode composite material according to Comparative Examples and an Embodiment which changed a ball milling time.

DETAILED DESCRIPTION

Figure 1:
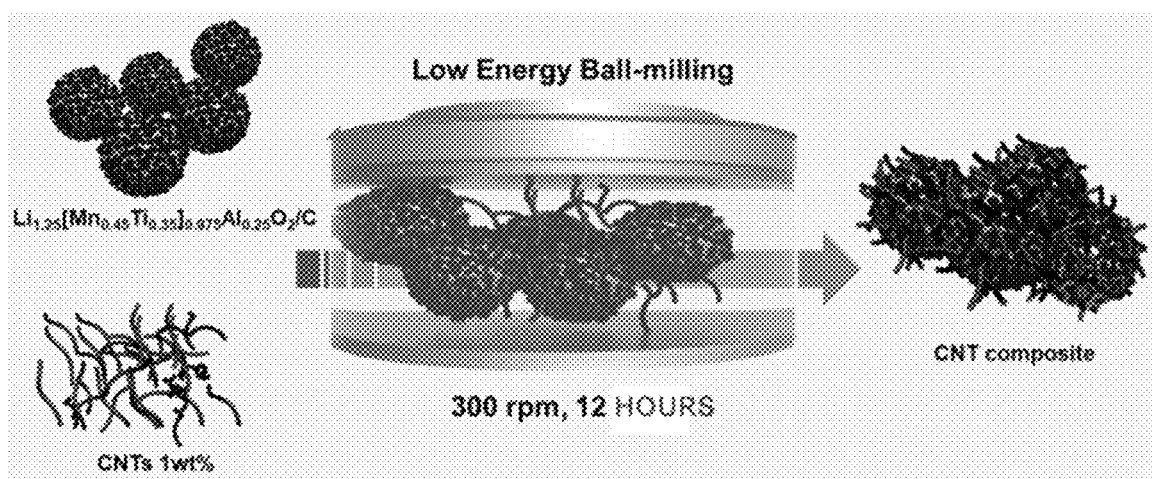
FIG. 1 is a schematic diagram showing an exemplary cathode composite material for an exemplary lithium secondary battery and an exemplary method of manufacturing the same according to an exemplary embodiment of the present invention.

Hereinafter, an embodiment of the present invention will be described in more detail with reference to the accompanying drawings. However, the present invention is not limited to the embodiments disclosed below but will be implemented in various different forms, and only the present embodiments are intended to complete the invention of the present invention, and are provided to completely inform those skilled in the art of the scope of the invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In an aspect, a cathode composite material (or "cathode material") for a lithium secondary battery is to a material of forming a cathode applied to a lithium secondary battery, and may include the cathode composite material. The cathode composite material may be made by attaching an acid-treated carbon nano tube (CNT) to a cathode active material. The lithium secondary battery may include a cathode including a cathode active material; a cathode including a cathode active material; and an electrolyte.

The cathode active material may include a Li—[Mn—Ti]—Al—O-based material capable of reversible intercalations and deintercalation of lithium ions.

The Li—[Mn—Ti]—Al—O-based material may preferably include, or be $Li_{1.25}[Mn_{0.45}Ti_{0.35}]_{0.975}Al_{0.025}O_2$.

The atomic ratios of Mn and Ti, and the molar ratios of Li, Al, and O are represented as $Li_{1.25}[Mn_{0.45}Ti_{0.35}]_{0.975}Al_{0.025}O_2$ in order to secure a high reversible capacity and to maintain excellent life characteristics during the cycle.

In addition, the carbon nanotube (CNT) attached to the surface of the cathode active material may be subjected to acid treatment before attaching to the surface of the anodized material. At this time, the acid treatment of the carbon nanotube (CNT) may increase the crystallinity of the carbon nanotube (CNT) to easily form the cathode active material and the composite.

By forming the composite by attaching the acid-treated carbon nanotube (CNT) to the cathode active material, low life characteristics and low output characteristics may be improved while eliminating the air instability and structural instability of the cathode active material.

The acid-treated carbon nanotube (CNT) may preferably be in an amount of about 1 to 5 wt % relative to the total weight of the cathode composite material. Accordingly, the cathode composite material may be manufactured by mixing an amount of about 95 to 99 wt % of the cathode active material and an amount of about 1 to 5 wt % of carbon nanotube (CNT) followed by ball milling.

When the mixed amount of carbon nanotube (CNT) is less than about 1 wt %, characteristics expected according to the attachment of carbon nanotube (CNT) may not be obtained, and when the mixed amount of carbon nanotube (CNT) is greater than about 5 wt %, the life characteristics may be reduced by implementing an inefficient capacity, after forming the composite with the cathode active material.

The carbon nanotube (CNT) to be acid-treated may preferably have a length of about 50 to 100 μm and a diameter of about 20 to 30 nm.

When the carbon nanotube (CNT) does not satisfy the suggested length range and diameter range, it is difficult to implement the shape of the carbon nanotube (CNT) and to form the composite with the cathode active material.

A method of manufacturing the cathode composite material formed as described above will be described.

FIG. 1 is a schematic diagram showing a cathode composite material for a lithium secondary battery and a method of manufacturing the same according to an embodiment of the present invention.

In an aspect, a method of manufacturing a cathode composite material for a lithium secondary battery provides steps of preparing a cathode active material; acid-treating a carbon nanotube (CNT); and complexing which forms the prepared cathode active material and the acid-treated carbon nanotube as a composite.

The preparing prepares a cathode active material by using a Li—[Mn—Ti]—Al—O-based material. At this time, the cathode active material or particularly, a Li—[Mn—Ti]—Al—O-based material may preferably include, or be $Li_{1.25}[Mn_{0.45}Ti_{0.35}]_{0.975}Al_{0.025}O_2$.

As described above, in order to prepare $Li_{1.25}[Mn_{0.45}Ti_{0.35}]_{0.975}Al_{0.025}O_2$ as the cathode active material, first, $Li_2CO_3$, $Mn_2O_3$, $TiO_2$, and $Al_2O_3$ may be mixed with anhydrous ethanol and ball-milled to synthesize a composite (Synthesis process). Accordingly, $Li_{1.25}[Mn_{0.45}Ti_{0.35}]_{0.975}Al_{0.025}O_2$ may be prepared as the synthesized composite.

In addition, the synthesized composite may be washed and then dried to pelletize (pelletizing process).

Then, the pelletized composite may be fired by heating at a temperature of about 900 to 1000° C. for about 10 to 14 hours in an inert atmosphere to obtain a powder (firing process).

Within the range of firing temperature and time presented in the firing process for synthesizing the cathode active material, a single phase material having a space group of Fm-3m of a Cubic structure may be manufactured. On the other hand, when being out of the range of the firing temperature and time presented, there is a problem in that the cathode active material may not be synthesized.

The acid-treating may include immersing the carbon nanotube (CNT) in an acidic solution and stirring the carbon nanotube (CNT). Accordingly, by increasing the crystallinity of the carbon nanotube (CNT), the composite may be easily formed or complexed with the cathode active material.

Preferably, the acid-treating preferably may include immersing the carbon nanotube (CNT) in the acidic solution and stirs it for about 10 to 14 hours.

For example, the acid-treating may be performed by adding an amount of about 0.5 g MW-CNT into 100 ml of $HNO_3$ (liquid or solution) and then stirring it at room temperature at about 80 RPM for about 10 to 14 hours.

When a time of acid-treating the carbon nanotube (CNT) is shorter than about 10 hours or longer than about 14 hours, the capacity may decrease significantly after approximately 20 cycles. Accordingly, the time of acid-treating the carbon nanotube (CNT) in consideration of a capacity retention rate may be of about 10 to 14 hours.

In addition, for example, there appeared that the MW-CNT was gradually dispersed like a spider web during acid treatment, and such a phenomenon may be very effective in attaching the carbon nanotube (CNT) to the surface of the cathode active material. However, the carbon nanotube (CNT) subjected to acid treatment for 16 hours have a problem in which the CNT may be shortly broken.

Accordingly, in order to attach the carbon nanotube (CNT) to the surface of the cathode active material in an ideal form, the carbon nanotube (CNT) having a very large surface area may be obtained by acid-treating the carbon nanotube (CNT) for about 10 to 14 hours.

Forming or complexing a cathode composite material may include coating the acid-treated carbon nanotube (CNT) on the surface of the prepared cathode active material.

As shown in FIG. 1, the complexing step may form the cathode composite material by attaching and coating the carbon nanotube (CNT) on the surface of the cathode active material when charging and ball-milling the cathode active material of $Li_{1.25}[Mn_{0.45}Ti_{0.35}]_{0.975}Al_{0.025}O_2$ and carbon nanotube (CNT) in a low-energy ball milling device.

The cathode active material in an amount of about 95 to 99 wt % and the carbon nanotube (CNT) in an amount of about 1 to 5 wt % may be mixed and then ball-milled to attach the carbon nanotube (CNT) on the surface of the cathode active material to be coated. The wt % is based on the total weight of the cathode composite material.

In addition, in the complexing, the ball milling may preferably be performed for about 12 to 24 hours.

When the ball milling time is shorter than about 12 hours, the shape of the carbon nanotube (CNT) may be kept and the complexing with the cathode active material may be obtained, but the characteristics similar to the battery performance before forming the composite may be kept. Accordingly, it is not possible to complex the cathode active material and the carbon nanotube (CNT).

In addition, when the ball milling time is longer than about 24 hours, the inherent characteristics of the carbon nanotube (CNT) may disappear, such that complexing the cathode active material and the carbon nanotube (CNT) may not be sufficient and phenomena of electrochemically reducing the capacity and reducing the life characteristics may occur.

Example

The exemplary embodiments of the present invention will be described through Comparative examples and Embodiments.

Experiment 1

An experiment was performed to select an atomic ratio or a molar ratio of each component of a Li—[Mn—Ti]—Al—O-based material used as a cathode active material.

At this time, in order to manufacture a cathode material, $Li_2CO_3$ ($Li_2CO_3$ is added in 3 wt % excess), $Mn_2O_3$ (synthesized by firing $MnCO_3$), $TiO_2$, and $Al_2O_3$ were mixed with an anhydrous ethanol solvent in a jar of a 45 ml volume. However, the atomic ratio or the molar ratio of each component of the Li—[Mn—Ti]—Al—O-based material was adjusted and matched as in Table 1 below. At this time, $ZrO_2$ balls of 10 mm×5 g, 5 mm×10 g, 1 mm×4 g were added. The ball milling conditions were set in 17 sets every 15 minutes at 300 rpm/5 h. After ball milling, it was washed with ethanol, dried and pelletized. The powder was obtained by firing in an Ar atmosphere at a temperature of 900° C. for 12 hours. Then, a primary carbon ball milling (300 rpm/6 h, 20 sets every 15 minutes) [active material:Acetylene black=9 wt. %:1 wt. %, $ZrO_2$ Ball: 10 mm×3 #, 5 mm×9 #, 1 mm×2 g] was performed and then a secondary carbon ball milling (300 rpm/12 h, 40 sets every 15 minutes), [$ZrO_2$ Ball: 1 mm×5.5 g] was performed. During the secondary carbon ball milling, 1 wt % of the acid-treated CNT was added.

In particular, the cathode active material was synthesized while changing the content of each component as in Table 1 below, and the electrochemical characteristics of the lithium secondary battery using the same were examined, and the charge and discharge curves and the cycle results as a result were shown in FIGS. 2A and 2B.

TABLE 1

| Items | Kinds of anode active material |
|---|---|
| Comparative Example 1-1 | $Li_{1.2}[Mn_{0.4}Ti_{0.4}]O_2$ |
| Comparative Example 1-2 | $Li_{1.2}[Mn_{0.4}Ti_{0.4}]O_2$ + Al 2.5% |
| Comparative Example 1-3 | $Li_{1.2}[Mn_{0.4}Ti_{0.4}]O_2$ + Al 5% |
| Comparative Example 1-4 | $Li_{1.25}[Mn_{0.45}Ti_{0.35}]O_2$ |
| Embodiment 1 | $Li_{1.25}[Mn_{0.45}Ti_{0.35}]O_2$ + Al 2.5% |
| Comparative Example 1-5 | $Li_{1.25}[Mn_{0.45}Ti_{0.35}]O_2$ + Al 5% |

Figure 2A:
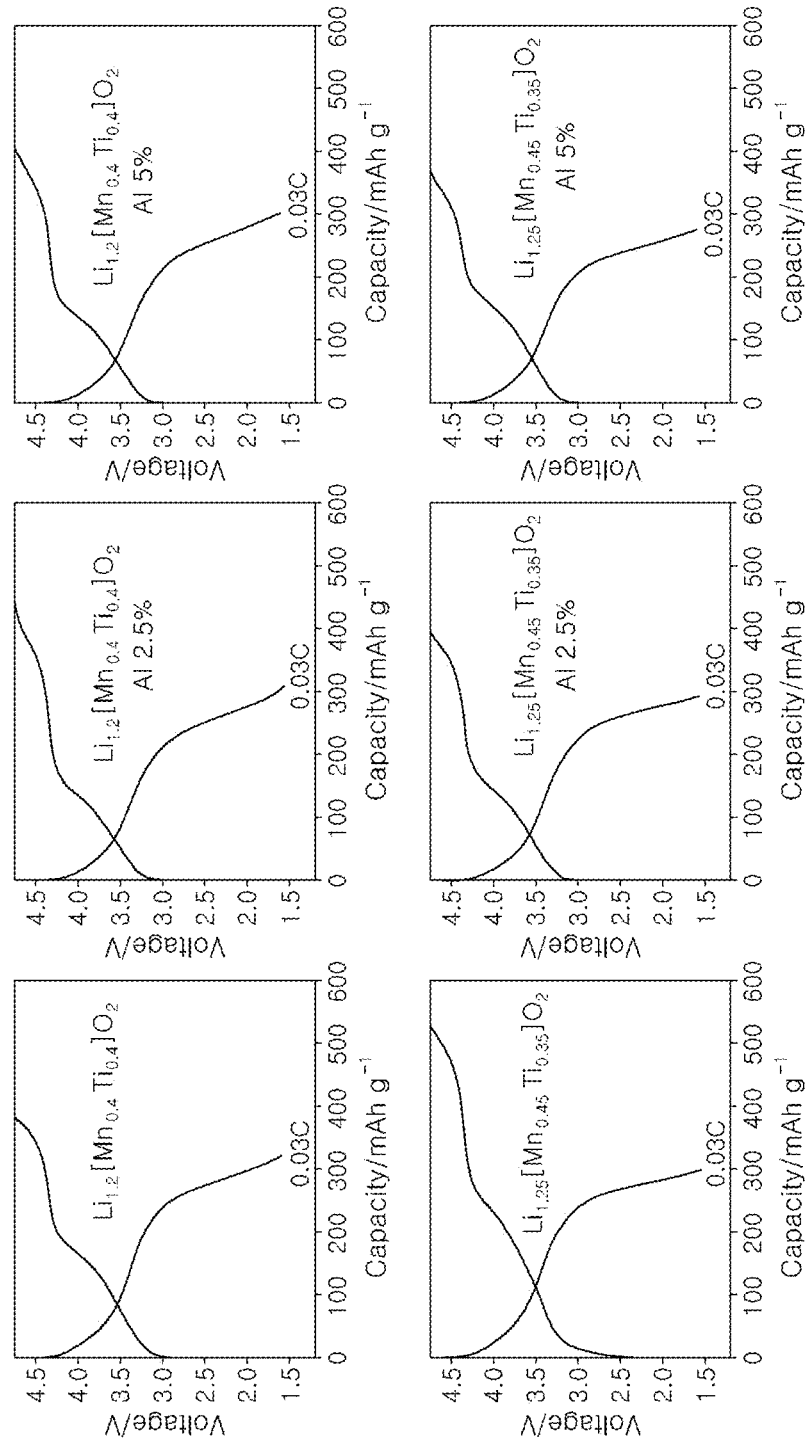
FIGS. 2A and 2B are graphs showing charge/discharge curves and cycle results of a cathode composite material according to Comparative Examples and an Embodiment which changed components of the cathode active material.
Figure 2B:
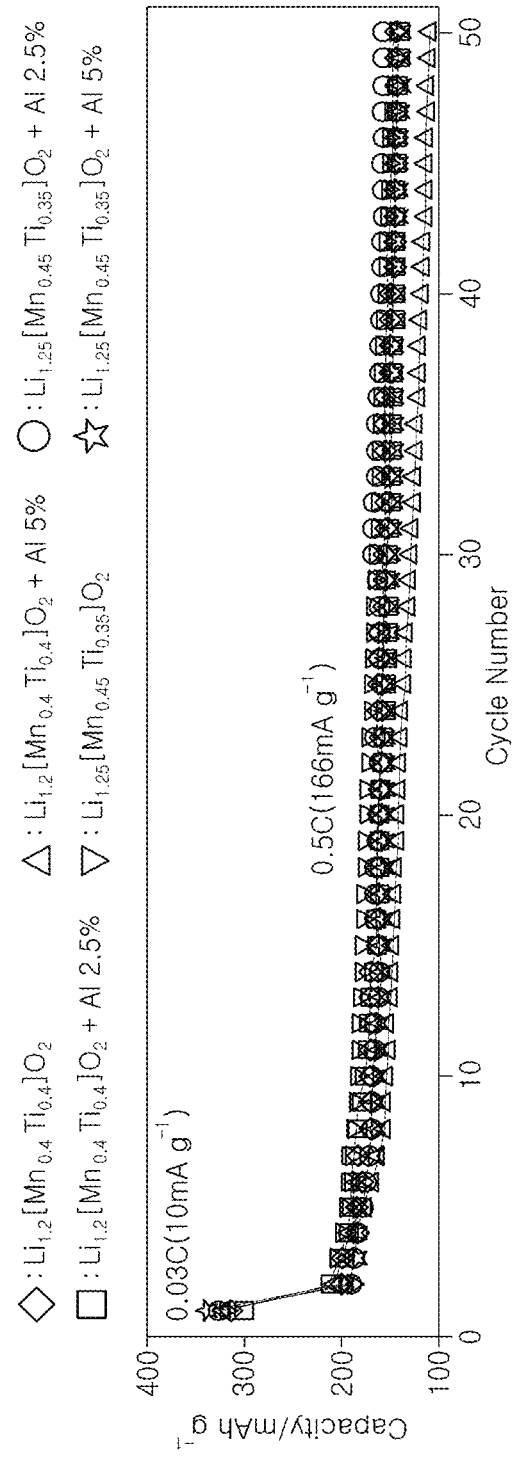

As shown in FIG. 2A, the Embodiment showed a greater reversible capacity than that of the Comparative Examples 1-1 to 1-5. In addition, as shown in FIG. 2B, the Embodiment had a better life characteristics than that of the Comparative Examples 1-1 to 1-5.

Accordingly, it was preferable to use $Li_{1.25}[Mn_{0.45}Ti_{0.35}]O_2$+Al 2.5% according to the Embodiment above, as the cathode active material and $Li_{1.25}[Mn_{0.45}Ti_{0.35}]_{0.975}Al_{0.025}O_2$ was preferably selected as the cathode active material.

Experiment 2

An experiment was conducted to select the content range of the cathode active material and the carbon nanotube (CNT).

Figure 3:
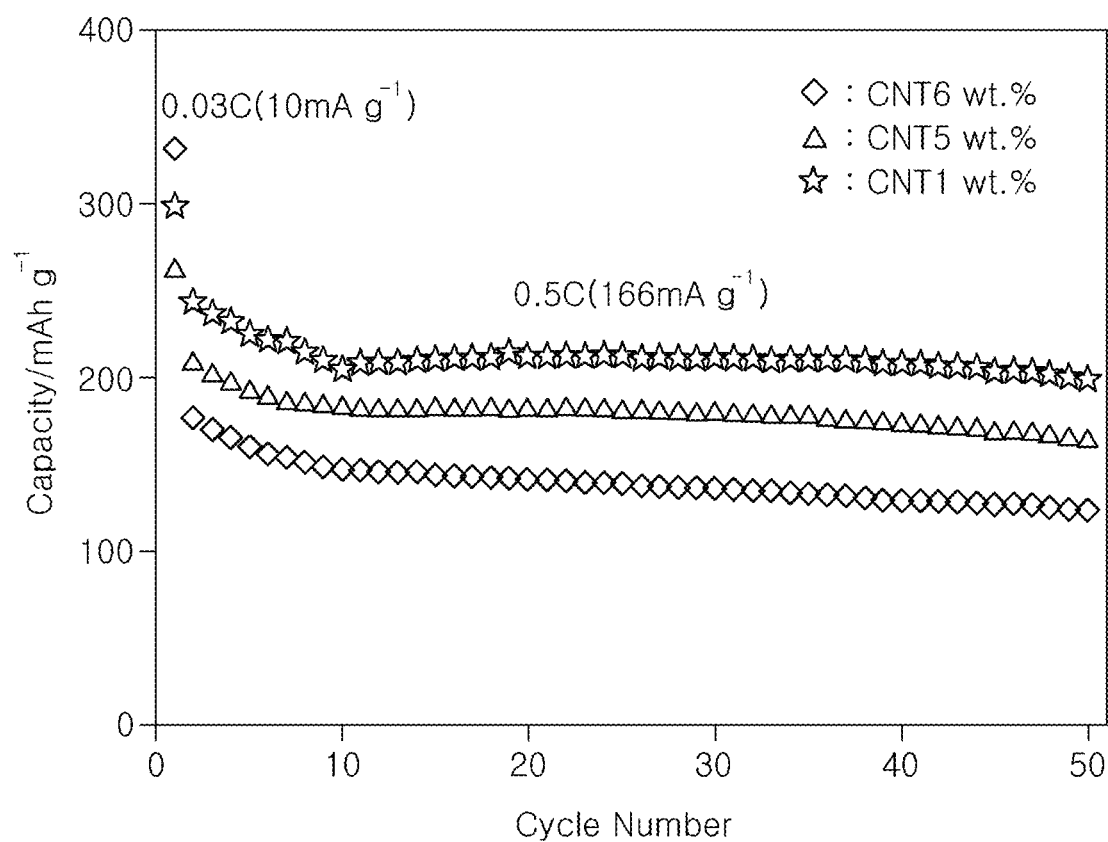
FIG. 3 is a graph showing the cycle result of the cathode composite material according to Comparative Examples and an Embodiment which changed the mixed amount of a carbon nanotube.

The carbon nanotube (CNT) was coated on the cathode active materials while changing the content of the carbon nanotube (CNT) to 1 wt %, 5 wt %, and 6 wt % with respect to the total amount of the entire cathode material, the electrochemical characteristics of the lithium secondary battery using the same were examined, and the cycle results as a result were shown in FIG. 3.

FIG. 3 is a graph showing the cycle results of the cathode materials according to Comparative Examples and an Embodiment which changed the mixing amount of the carbon nanotube.

As shown in FIG. 3, as the content of the carbon nanotube (CNT) increased, more carbon nanotube (CNT) was present in the cathode material, but the life characteristics were reduced by implementing an inefficient capacity after forming the composite. Accordingly, the content range of the carbon nanotube (CNT) was preferably to be 1 to 5 wt %.

Experiment 3

An experiment was conducted to select the length and diameter range of the carbon nanotube (CNT) forming the cathode material.

The carbon nanotube (CNT) were coated on the cathode material while changing the length and diameter thereof as in Table 2 below, the images of the carbon nanotube (CNT) and the cathode material were observed, and the results were shown in FIGS. 4A to 4C.

Figure 4A:
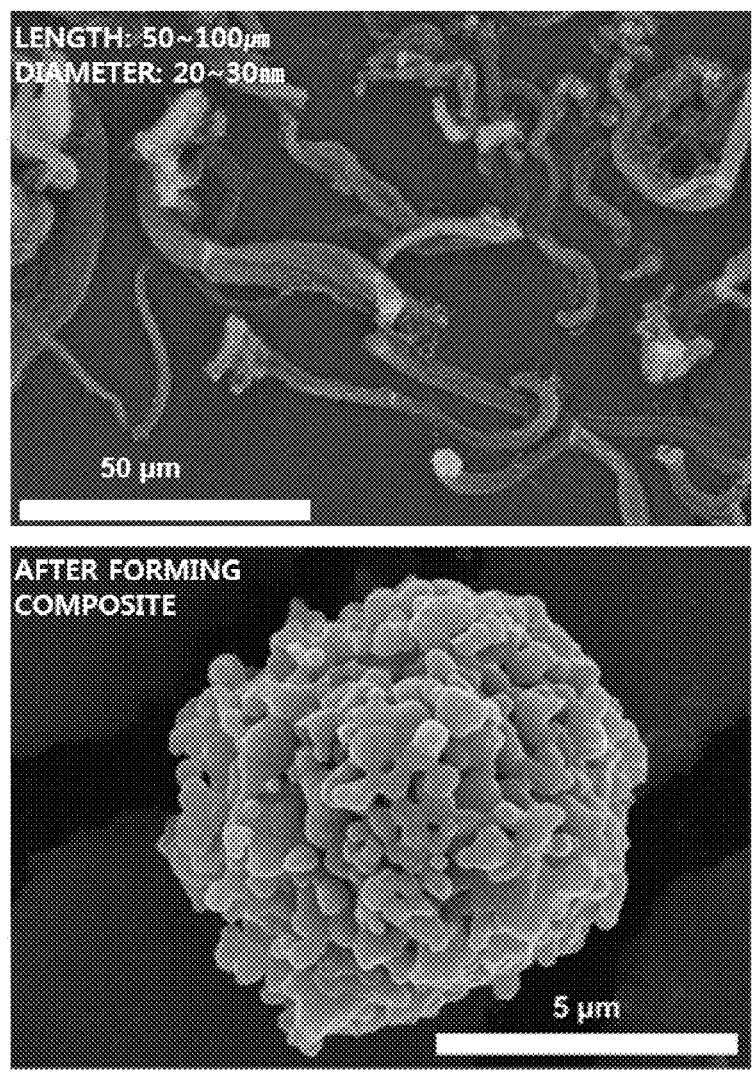
FIGS. 4A to 4C are photographs showing the appearances after molding a carbon nanotube and a composite according to Comparative Examples and an Embodiment which changed the length and diameter of the carbon nanotube.
Figure 4B:
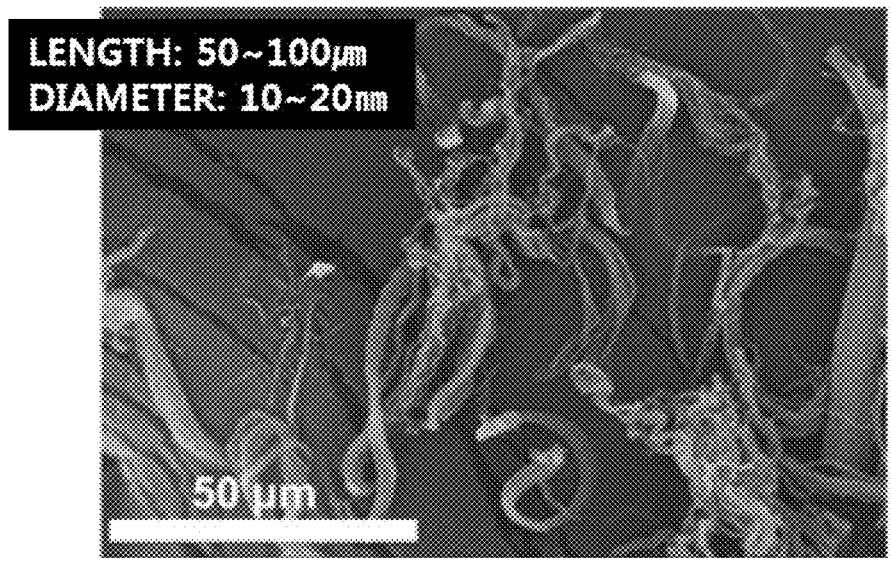
Figure 4B:
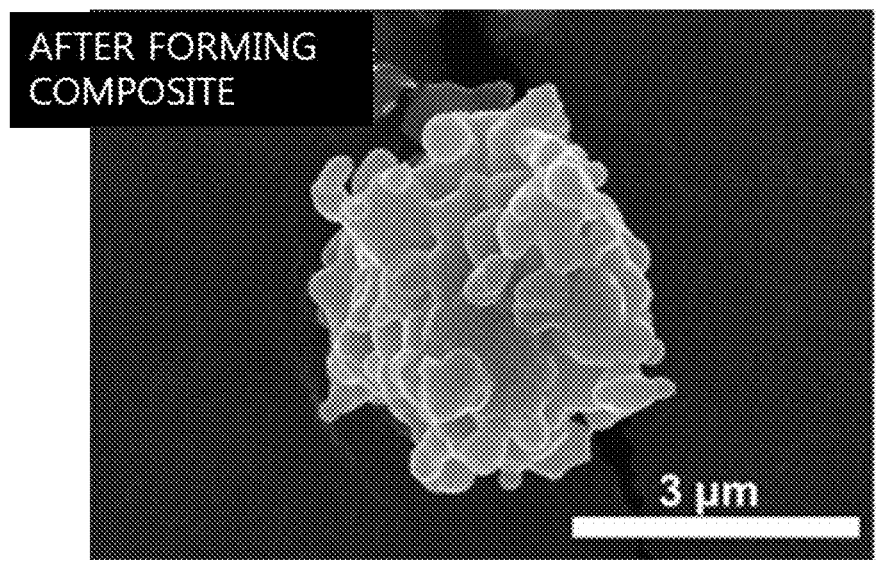
Figure 4C:
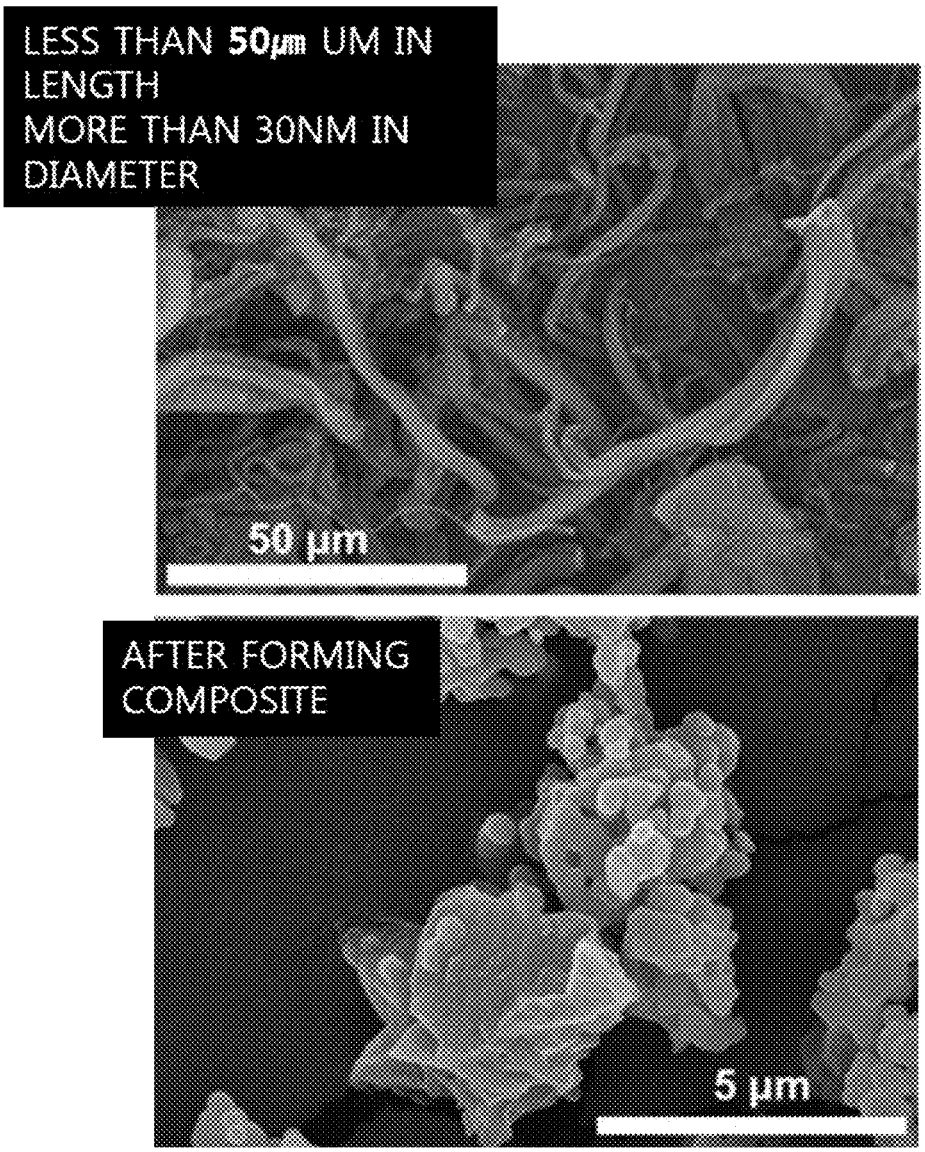

FIGS. 4A to 4C are photographs showing the shape after molding the carbon nanotube and the composite according to Comparative Examples and an Embodiment which changed the length and diameter of the carbon nanotube.

TABLE 2

| Items | Length(μm) | Diameter(nm) |
|---|---|---|
| Embodiment 2 | 50~100 | 20~30 |
| Comparative Example 2-1 | 50~100 | 10~20 |
| Comparative Example 2-2 | less than 50 | more than 30 |

As shown in FIG. 4A, when the length of the carbon nanotube (CNT) was 50 to 100 μm and the diameter thereof was 20 to 30 nm, the shape of the carbon nanotube (CNT) was implemented, the composite was formed correctly.

On the other hand, as shown in FIGS. 4B and 4C, when the length and diameter of the carbon nanotube (CNT) was out of the range presented, the shape of the carbon nanotube (CNT) was not properly implemented, and it was difficult to form the composite. Accordingly, the carbon nanotube (CNT) was preferably to have a length of 50 to 100 μm and a diameter of 20 to 30 nm.

Experiment 4

An experiment was conducted to select a synthesis temperature and a synthesis time in the synthesis process.

Figure 5A:
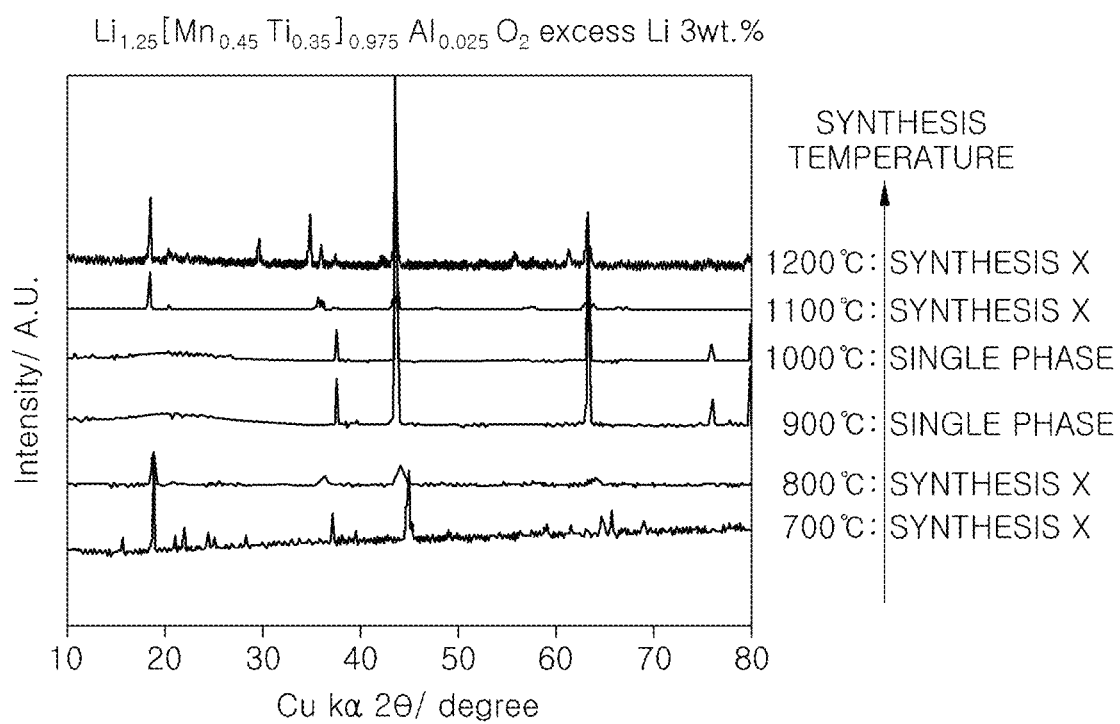
FIGS. 5A and 5B are diagrams showing an XRD result of a cathode composite material according to Comparative Examples and an Embodiment which changed the synthesis temperature and time in a synthesis process.

The synthesis process was carried out while changing the synthesis temperature in units of 100° C. up to 700 to 1200° C., and the results thereof were shown in FIG. 5A. In addition, the synthesis process was carried out by changing the synthesis time from 9 to 17 hours, and the results thereof were shown in FIG. 5B.

Figure 5B:
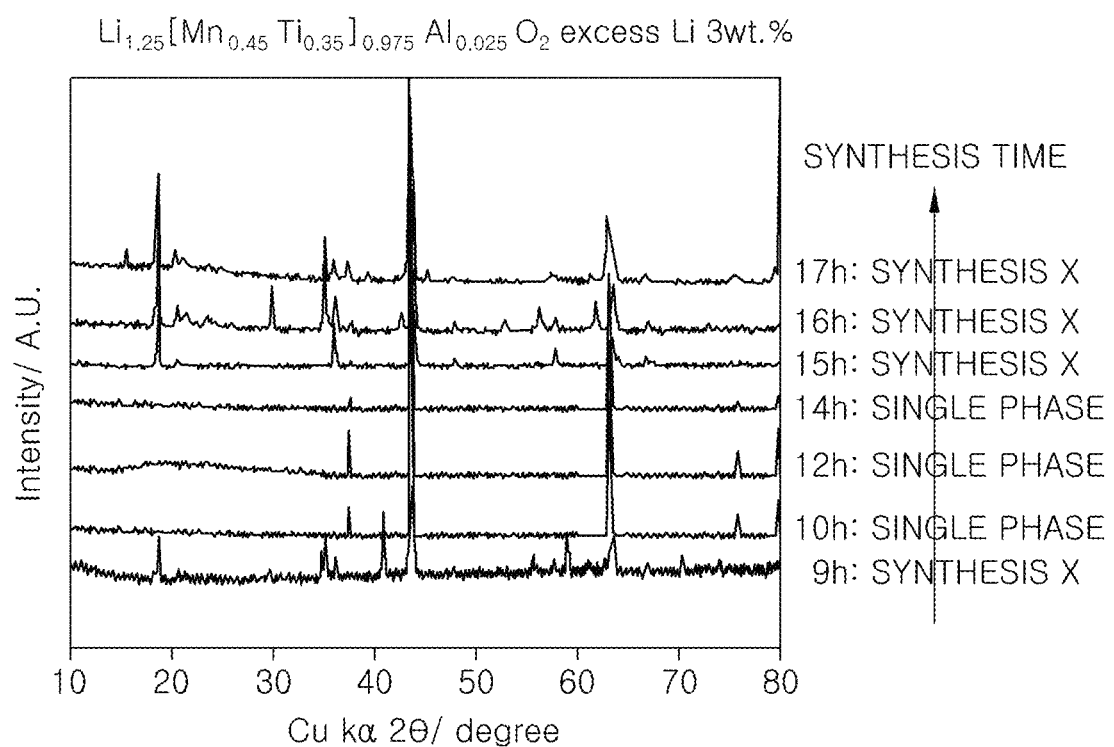

FIGS. 5A and 5B are diagrams showing XRD results of the cathode material according to Comparative Examples and an Embodiment which changed a synthesis temperature and time during the synthesis process.

As shown in FIG. 5A, a single phase material having a space group of Fm-3m of a Cubic structure was present in a section in which the synthesis temperature was in a range of 900 to 1000° C. On the other hand, the synthesis was not made in a temperature section other than the presented synthesis temperature.

Accordingly, the synthesis temperature was preferably in a range of 900 to 1000° C.

In addition, as shown in FIG. 5B, a single-phase material having a space group of Fm-3m of a Cubic structure was present in a section in which the synthesis time was 10 to 14 hours. On the other hand, the synthesis was not made in a time section other than the presented synthesis time.

Experiment 5

An experiment was conducted to select a time of acid-treating the carbon nanotube (CNT).

Figure 6:
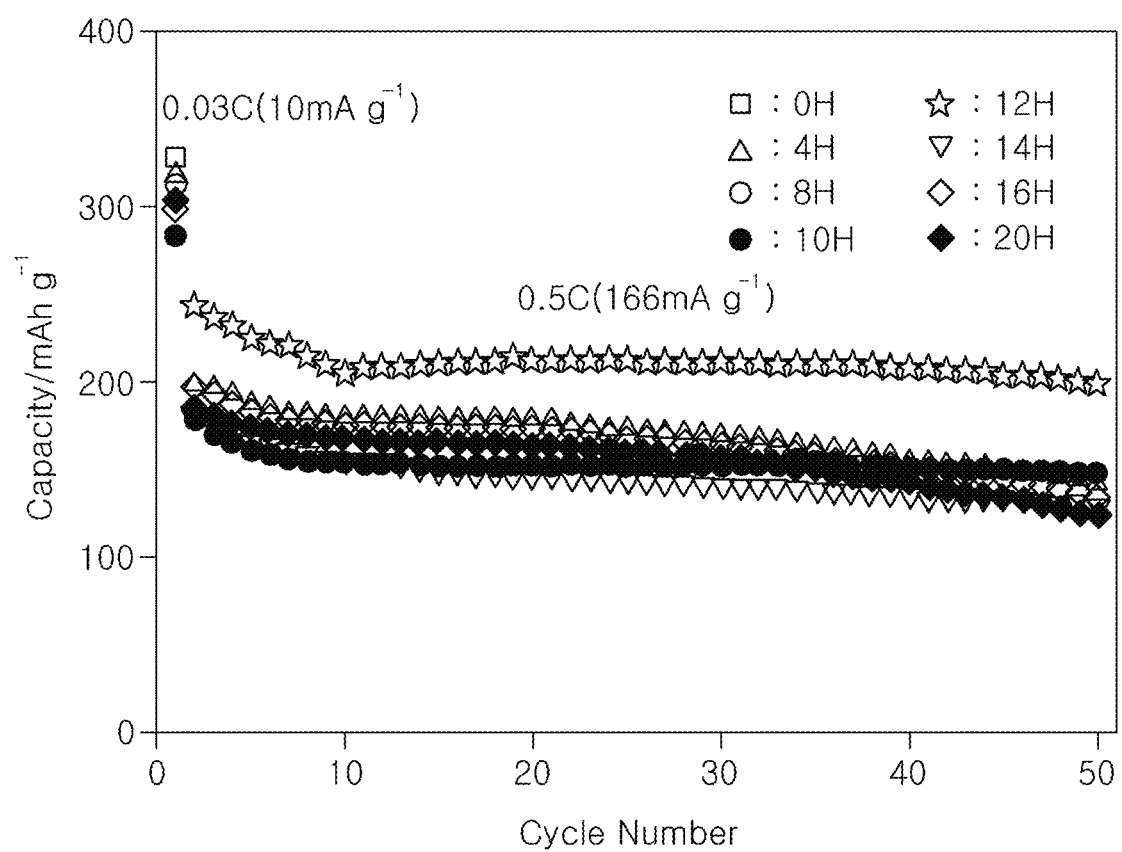
FIG. 6 is a graph showing the cycle result of a cathode composite material according to Comparative Examples and an Embodiment which changed an acid-treated time.

The acid treatment was carried out by changing the acid treatment time from 0 to 20 hours, and the results thereof were shown in FIG. 6.

FIG. 6 is a graph showing cycle results of the cathode material according to Comparative Examples and an Embodiment which changed an acid treatment time.

As shown in FIG. 6, there was no difference because an initial discharge capacity according to the acid treatment time was about 300 mAh $g^{-1}$. However, the performance of the composite coated with the carbon nanotube (CNT) treated for 8 hours or less and 16 hours or more of the acid treatment time showed an inefficient aspect showing a large capacity reduction after approximately 20 cycles. Accordingly, the acid treatment time of the carbon nanotube (CNT) was preferably from 10 to 14 hours in consideration of the capacity retention rate.

Experiment 6

An experiment was conducted to select a ball milling time in the complexing.

Figure 7B:
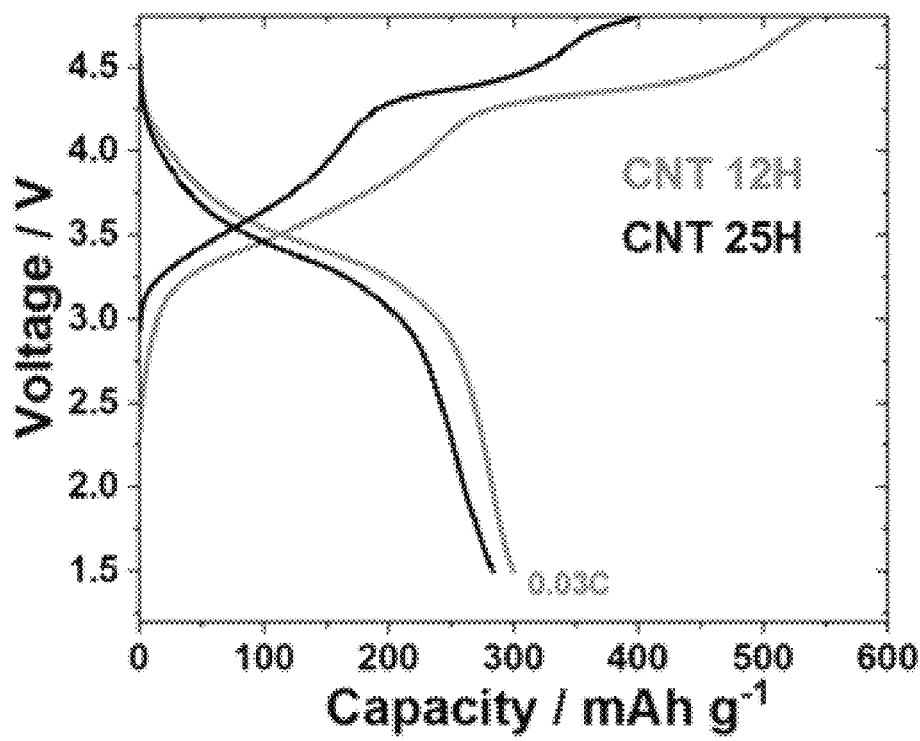
Figure 7B:
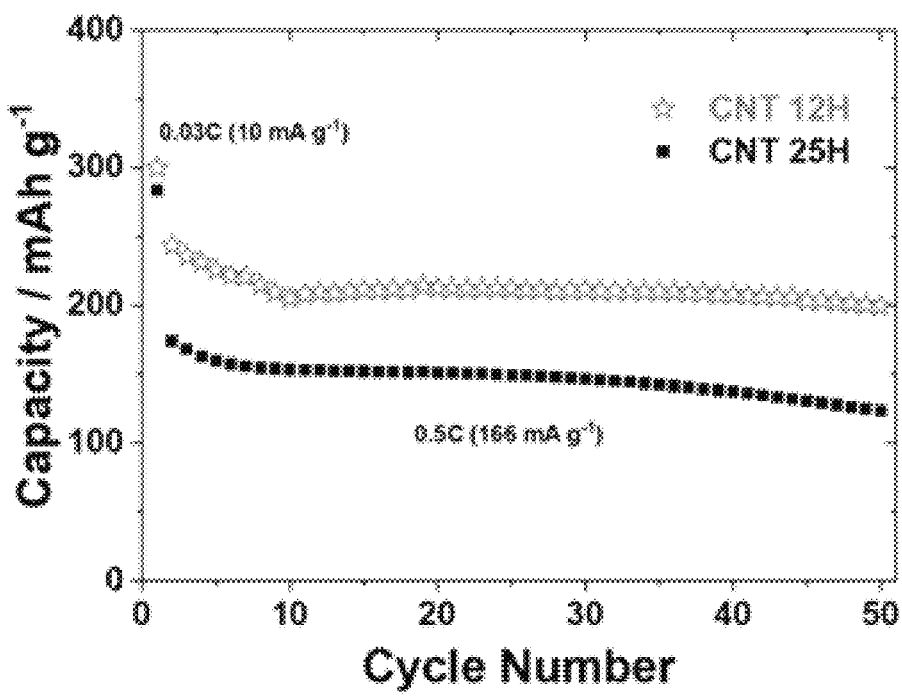

In the complexing, the complexing was performed while changing the ball milling time to 0 hours, 11 hours, 12 hours, and 25 hours, and the results thereof were shown in FIGS. 7A and 7B.

FIGS. 7A and 7B are graphs showing charge and discharge curves of one cycle and cycle results of the cathode material according to Comparative Examples and an Embodiment which changed a ball milling time.

As shown in FIG. 7A, when the ball milling time was shorter than 12 hours, it was similar to the battery performance before forming the composite. It may be inferred that this makes no sense in complexing.

As shown in in FIG. 7B, when the ball milling time was longer than 24 hours, the inherent characteristics of the carbon nanotube (CNT) disappeared, which may not be the complexing, and showed the reduction in the electrochemically capacity and the reduction in the life characteristics. Accordingly, the ball milling time in the complexing was preferably 12 to 24 hours.

Experiment 7

Electrochemical characteristics of the cathode material according to an Embodiment and the cathode material according to a Comparative Example were compared through a 12-hour acid treatment method of the carbon nanotube (CNT).

At this time, the Embodiment applied the cathode material attached and coated 1 wt % of the carbon nanotube (CNT) acid-treated for 12 hours to the surface of the cathode active material of $Li_{1.25}[Mn_{0.45}Ti_{0.35}]_{0.975}Al_{0.025}O_2$, and the Comparative Example applied the cathode active material of $Li[Ni_{0.8}Co_{0.16}Al_{0.04}]O_2$.

Figure 8A:
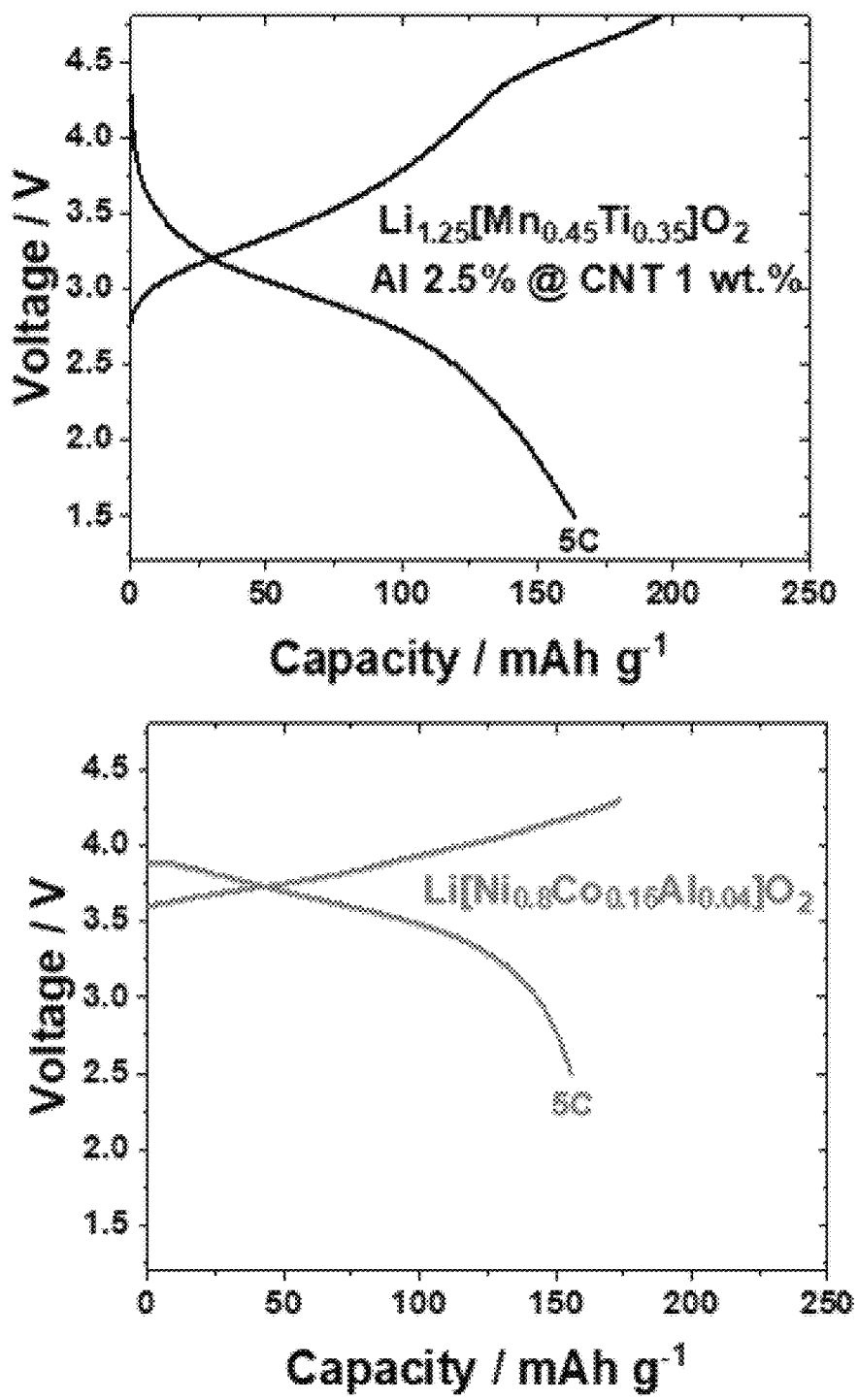
FIGS. 8A to 8C are diagrams showing the results of measuring the electrochemical characteristics of an Embodiment and a Comparative Example.
Figure 8B:
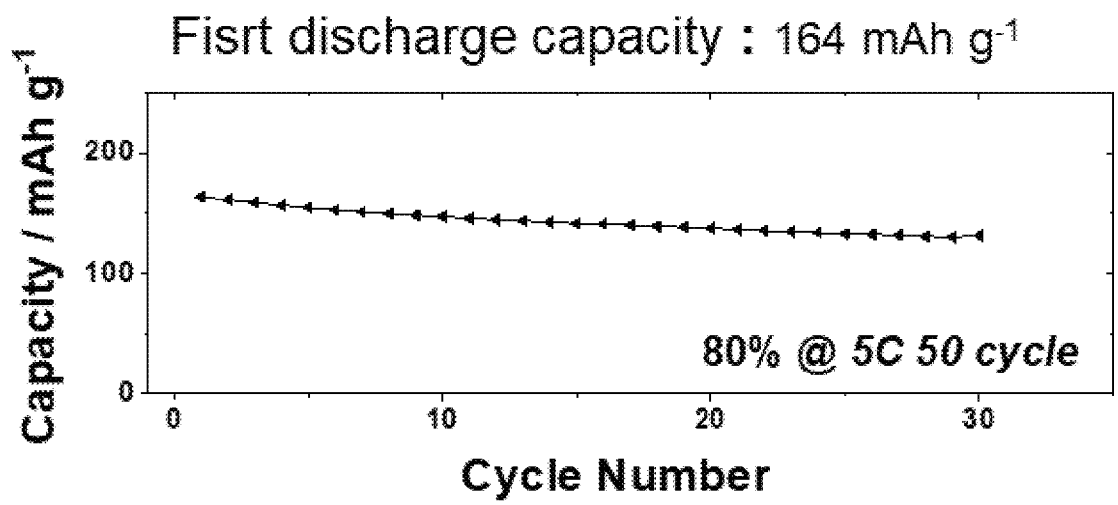
Figure 8B:
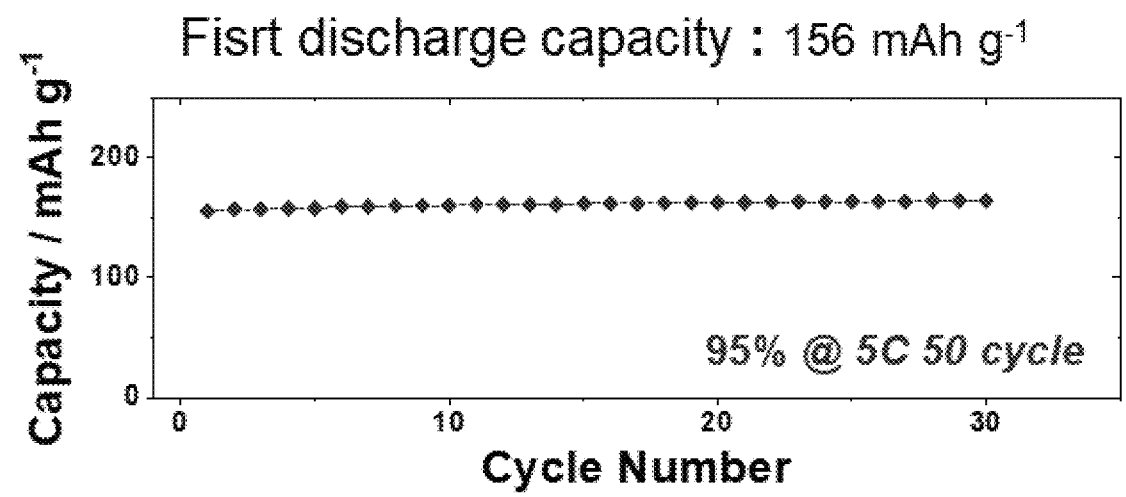
Figure 8C:
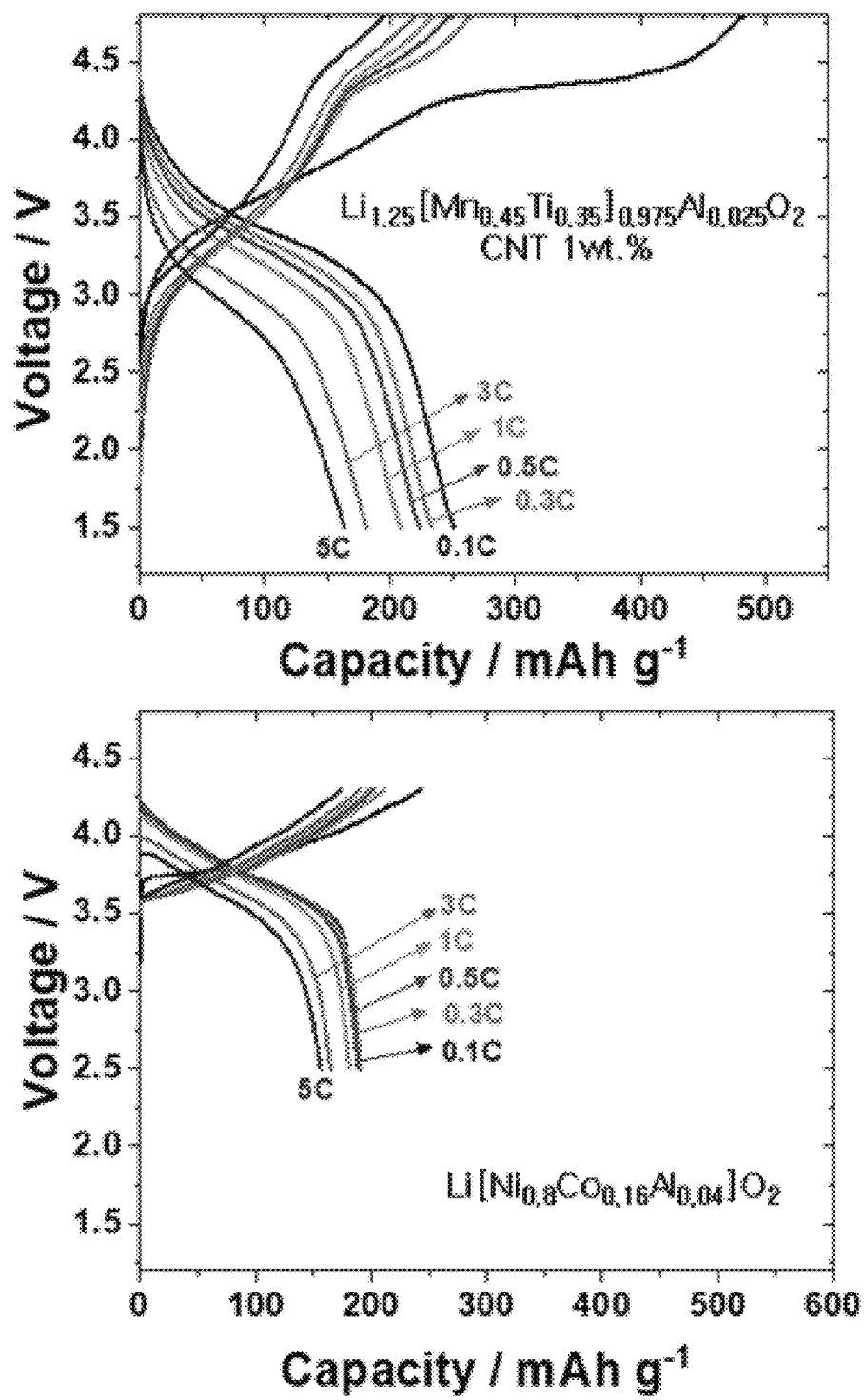

In addition, the results of measuring the electrochemical characteristics of the Embodiment and the Comparative Example are shown in FIGS. 8A to 8C.

As shown in FIG. 8A, the Embodiment showed a greater reversible capacity than that of the Comparative Example.

As shown in FIG. 8B, the Embodiment showed a greater initial discharge capacity than that of the Comparative Example.

As shown in FIG. 8C, the Embodiment showed a greater rate characteristic than that of the Comparative Example.

While the present invention has been described with reference to the accompanying drawings and the exemplary embodiments described above, the present invention is not limited thereto and is defined by the claims to be described later. Accordingly, those skilled in the art may variously change and modify the present invention without departing from the technical spirit of the appended claims to be described later.

What is claimed is:

1. A cathode composite material for a lithium secondary battery consisting of: a Li—[Mn—Ti]—Al—O-based cathode active material, an acetylene black, and a carbon nanotube (CNT) present on the Li—[Mn—Ti]—Al—O-based cathode active material, wherein the carbon nanotube is treated with an acid so as to be attached to the surface of the Li—[Mn—Ti]—Al—O-based cathode active material; wherein the carbon nanotube has a length of about 50 to 100 um and a diameter of about 20 to 30 nm.

2. The cathode material for the lithium secondary battery according to claim 1, wherein the Li—[Mn—Ti]—Al—O-based cathode active material comprises $Li_{1.25}[Mn_{0.45}Ti_{0.35}]_{0.975}Al_{0.025}O_2$.

3. The cathode material for the lithium secondary battery according to claim 1, wherein the cathode composite material comprises the carbon nanotube in an amount of about 1 to 5 wt % relative to the total weight of the cathode composite material.

4. A method of manufacturing a cathode composite material for a lithium secondary battery, consisting of: preparing a Li—[Mn—Ti]—Al—O-based cathode active material; treating a carbon nanotube (CNT) by immersing and stirring it in an acidic solution; and forming the cathode composite material by combining the prepared Li—[Mn—Ti]—Al—O-based cathode active material and the treated carbon nanotube.

5. The method according to claim 4, wherein the Li—[Mn—Ti]—Al—O-based cathode active material is prepared by steps of: synthesizing a composite by mixing $Li_2CO_3$, $Mn_2O_3$, $TiO_2$, and $Al_2O_3$ with anhydrous ethanol and first ball milling; pelletizing by washing and then drying the synthesized composite; and heating and firing the pelletized composite in an inert atmosphere to obtain a powder.

6. The method according to claim 5,
wherein the composite comprises $Li_{1.25}[Mn_{0.45}Ti_{0.35}]_{0.975}Al_{0.025}O_2$, and
wherein the composite in the firing is heated at a temperature of about 900 to 1000° C. for about 10 to 14 hours.

7. The method according to claim 4, wherein the treating the carbon nanotube (CNT) comprises immersing the carbon nanotube (CNT) in the acidic solution and stirring it for about 10 to 14 hours.

8. The method according to claim 4, wherein the cathode composite material comprises the Li—[Mn—Ti]—Al—O-based cathode active material in an amount of about 95 to 99 wt % and the carbon nanotube in an amount of about 1 to 5 wt %, based on the total weight of the cathode composite material.

9. The method according to claim 4, wherein the forming the cathode composite material comprises second ball milling the prepared Li—[Mn—Ti]—Al—O-based cathode active material and the treated carbon nanotube.

10. The method according to claim 9, wherein the ball milling is performed for about 12 to 24 hours.

11. A lithium secondary battery comprising:
a cathode comprising the cathode composite material according to claim 1;
an anode comprising an anode active material; and
an electrolyte.

* * * * *